March 15, 1955

A. J. HUARD 2,703,924

SPRING PAD REPLACEMENT IN RAILWAY TRUCKS, PARTICULARLY
STABILIZED TRUCKS

Filed May 17, 1952

INVENTOR.
Alexander J. Huard.
BY
Maurice A. Crews

ATTORNEY

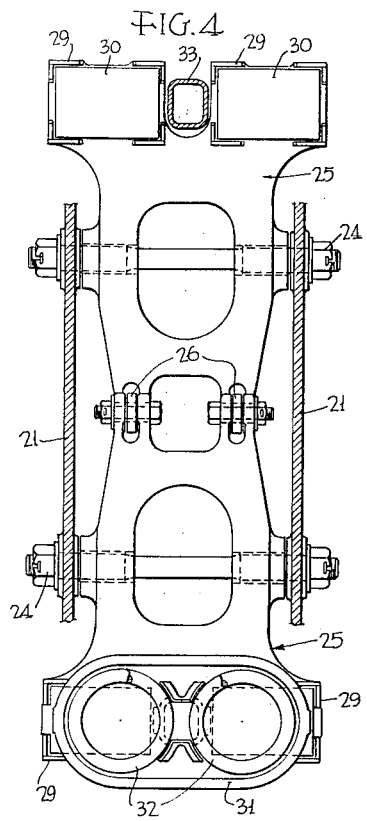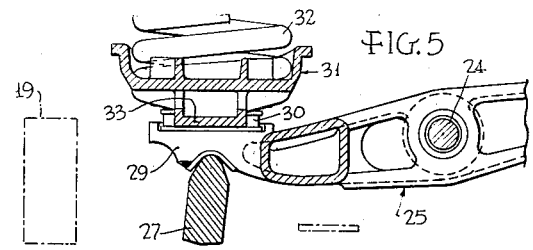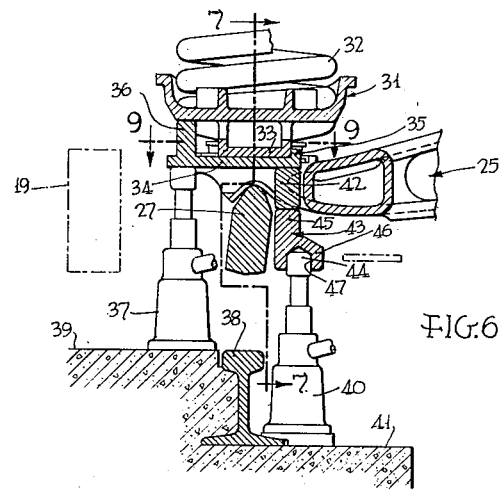

United States Patent Office 2,703,924
Patented Mar. 15, 1955

2,703,924

SPRING PAD REPLACEMENT IN RAILWAY TRUCKS, PARTICULARLY STABILIZED TRUCKS

Alexander J. Huard, Philadelphia, Pa., assignor to The Budd Company, Philadelphia, Pa., a corporation of Pennsylvania Application May 17, 1952, Serial No. 288,567

1 Claim. (Cl. 29—283)

The invention relates to the replacement of insulating pads, mostly rubber, widely used under the ends of coil springs of railway trucks, and its main object is facilitating and speeding up such replacement which becomes necessary from time to time.

In certain types of railway trucks with rubber pads or sandwiches inserted between the seats of bolster-supporting springs and transverse members, such as stabilizing levers, the replacement of the rubber pads has been very difficult and time-consuming, causing correspondingly long-time withdrawal of affected cars from use. In most cases the known procedure means the removing of the truck from underneath the car, turning it upside down, and extensively disassembling and reassembling it.

The invention provides procedure and equipment greatly facilitating and drastically speeding up the pad replacement. For a car having two trucks with two pairs of rubber sandwiches each, the new procedure takes not more than an hour's time and does not require separation of the trucks from the body of the railway car.

The invention makes use of the small available space between spring seat member, the bifurcation of the stabilizing lever or the like, and the hanger bar, and it applies in this space auxiliary equipment or a tool and lifting jacks so as to raise the spring seat member, permitting the removal and reinsertion of rubber sandwiches.

The objects, features, and advantages of the invention are more fully disclosed in connection with the illustration of one form of the invention in the attached drawing and with the following description thereof.

In the drawing:

Fig. 4 is a fragmentary plan view and section along line 4—4 of Fig. 3;

Fig. 5 is a fragmentary section showing part of Fig. 3 on a larger scale;

Fig. 6 shows the same parts in section as Fig. 5 together with the new lifting equipment and a partial section of truck, floor, and pit over which the truck is located;

Fig. 7 is a fragmentary longitudinal section along line 7—7 of Fig. 6;

Fig. 8 is a section corresponding to Fig. 7 showing the springs lifted, permitting the replacement of the pads; and Fig. 9 is a fragmentary plan view and section along line 9—9 of Fig. 6.

For describing the invention and for understanding it, an illustration and description of the type of truck for which it is designated is indispensable.

Figure 1:
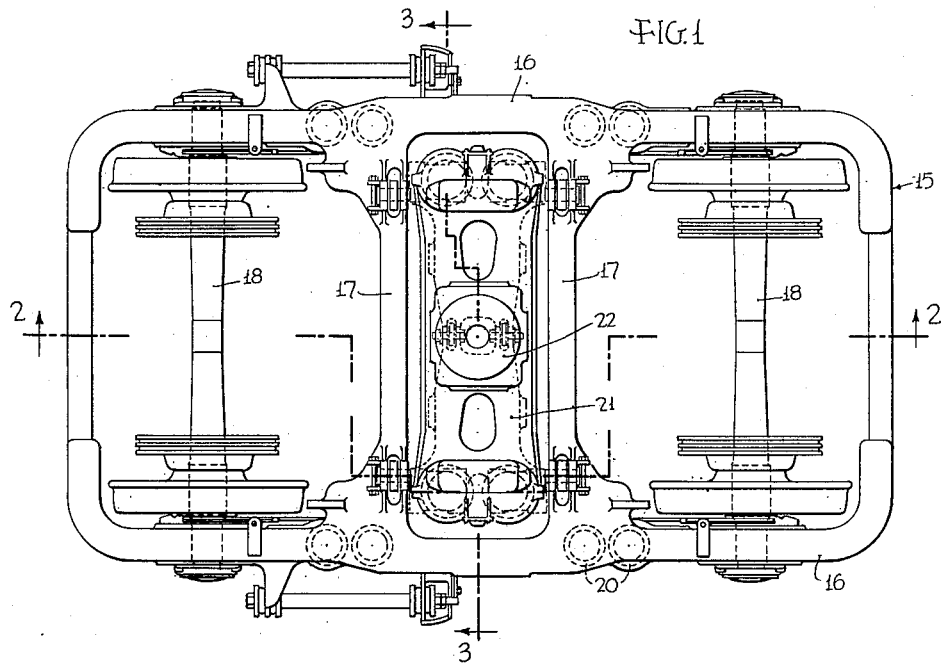
Fig. 1 is a diagrammatic plan view of the type of railway truck to which the invention is to be applied.
Figure 2:
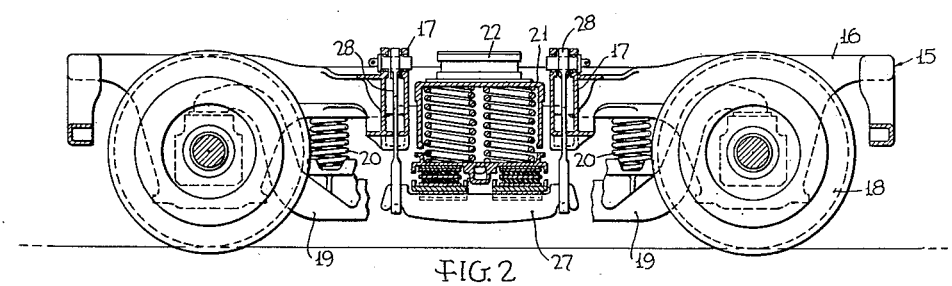
Figs. 2 and 3 are, respectively, longitudinal and transverse sections along the correspondingly numbered lines of Fig. 1.
Figure 3:
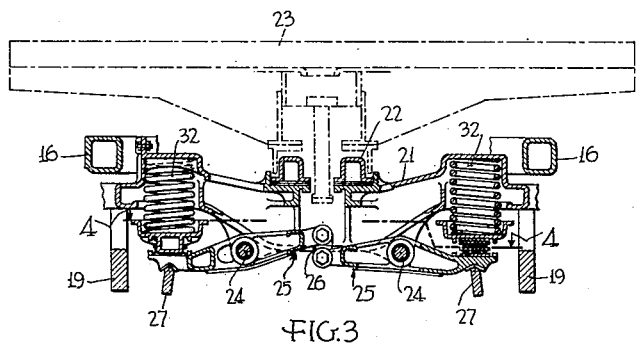

The type of known truck in question, yet without showing any features of the invention, is illustrated in Figs. 1 to 4.

The truck has a frame 15 with longitudinal side members 16 and cross members 17. Guided in pedestals of the side members 16 are wheel-carrying axles 18 on which the truck frame rests by means of equalizers 19 and coil springs 20. In an opening surrounded by frame members 16 and 17 is a bolster 21, connected by center plate 22 to vehicle body 23, the latter diagrammatically indicated by dot-and-dash lines in Fig. 3.

Journals 24 connect transverse double arm stabilizer levers 25 to bolster 21. The inner ends of levers 25 are interconnected by link 26, while the other ends have knife-edge supports on hanger bars 27. The latter are journalled by swing hangers 28 to frame members 17.

Each stabilizer lever 25 is bifurcated at its outer end, and each of its two ends or bifurcations 29 carries by means of a rubber sandwich 30 a spring plate or seat 31 for the lower ends of sets or pairs of coil springs 32, the upper ends of which support bolster 21. Plate 31 usually has a downward extension 33 which reinforces the plate and projects into the space between the arms 29 and the sandwiches 30.

Considering the parts of the truck illustrated and specifically described and other parts ordinarily present in a truck (not illustrated), such as, brake linkage, brake cylinders, etc., it would appear evident that there is no room to permit the application of tools for simply lifting plates 31 against the action of springs 32 from the arms 29 of the stabilizing levers so as to permit replacement of the sandwiches 30. Indeed, this is the view evidently held by all concerned with the result that the accepted procedure has been to remove the truck from underneath the car, turn it upside down, partly dismantle it with special equipment, replace the pads, reassemble the truck and reunite it with the car. This accepted and still exclusively-used procedure means at least a day's work of several workmen for each car which, of course, for the same time is unavailable for actual use.

The equipment and procedure forming the subject matter of the present application will now be described.

A relatively thin and narrow auxiliary plate or member 34 is inserted in the space between arms 29, projection 33, and bar 27. Plate 34 engages the underside of projection 33, has at its inner end a small protrusion or projection 35 (Figs. 6, 9) gripping behind projection 33, and has at each outer end an upwardly projecting portion or extension 36 engaging the underside of the main body of spring seat 31.

A lifting jack 37 is placed on the outside of truck-supporting rail 38 between a main portion 39 of the floor or ground and the outer end of plate 34 so that the jack is in vertical alignment with plate extension 36.

A second lifting jack 40 is supported just inside rail 38 on a downward offset or step 41 of an inspection pit. An insert or block 42 shaped to fit into the restricted space between bar 27, the main body of lever 25, and the latter's arms 29 is placed from underneath against the underside of member 34 at the inner end thereof. A second insert 43 supports by its upper end insert 42 and is in turn supported by the lifting head 44 or jack 40.

Insert 43 has an upper end portion 45 of relatively small cross-sectional area and of a shape similar to member 42 so as to fit in the same space as the latter. The lower portion 46 of member 43 is arranged inwardly eccentric with respect to the upper portion 45 so as to clear bar 27, while being of sufficiently large diameter for the reception of lifting head 44 in hole 47.

While insert 42 might form one piece with insert 43, their formation as two separate inserts is sometimes preferred, inasmuch as it permits use of a standard-height jack which may be slipped in horizontally with insert 43 thereon underneath the previously placed insert 42.

It takes only a few minutes to place the new equipment, to lift plate 31 against springs 32 and the weight of the car from the sandwiches 30, remove and reinsert the latter, lower plate 31 onto the sandwiches, and remove the equipment.

As indicated above, with one set of equipment the whole procedure takes for one or two workmen less than an hour for all pad locations of a two-truck railway car. No other parts of truck and vehicle body, and of the connections between them and their parts are in any way affected. No brake conduits, generator, drives, etc., need disconnecting and reconnecting as hitherto necessary where the truck had to be separated from the body and had to be turned upside down.

The invention is not restricted to the details of the illustrated embodiment but is susceptible to modifications, most of which will present themselves at once to those skilled in the art. It appears evident, for instance, that part of the equipment, such as plate 34 with its extension 36 and insert 42 and/or insert 43, may be replaced by formations integral with or at least permanently connected to plate 31. It is likewise evident that practically the same conditions may be encountered and may be met by the new method and equipment, in trucks having, instead of the illustrated transverse stabilizer levers, other known types of transverse members with bifurcated ends, such as spring planks.

What is claimed is:

Auxiliary equipment for lifting springs off and lowering them unto their supports without removing a railway truck from the track and from underneath a body carried by it in the type of railway truck having: a frame, a bolster, a transverse member, a set of bolster springs between the outer bifurcated ends of said member and said bolster, a spring plate under the lower ends of said springs resting with the interposition of vibration absorbing pads on said ends of the member, swing hangers and a hanger bar supporting said bifurcated ends from said frame, a longitudinal equalizer closely adjacent said hanger bar, the equipment comprising: an insert member provided near its underside with means for engaging the lifting head of a jack to be placed on the inner side of one rail of said truck at a location inwardly offset from the space between the bifurcated ends of said spring member and said hanger bar, and having its upper side shaped matingly to the underside of said spring plate by means projecting into said space and being outwardly offset relative to the location of said jack for the purpose of lifting said plate for inspection, removal and replacement of said vibration absorbing pads.

References Cited in the file of this patent

UNITED STATES PATENTS

| | | |
|---|---|---|
| 1,881,199 | Koehler | Oct. 4, 1932 |
| 2,241,418 | Nystrom et al. | May 13, 1941 |
| 2,425,706 | Thress | Aug. 12, 1947 |
| 2,523,375 | Jones et al. | Sept. 26, 1950 |
| 2,574,230 | Thress | Nov. 6, 1951 |